United States Patent [19]

Fujii et al.

[11] Patent Number: 4,729,556
[45] Date of Patent: Mar. 8, 1988

[54] APPARATUS FOR DETECTING THE THICKNESS OF BANK NOTE

[75] Inventors: Kiyoshi Fujii, Tokyo; Mitsuhiro Ikeda, Warabi, both of Japan

[73] Assignee: Laurel Bank Machines Co., Ltd., Tokyo, Japan

[21] Appl. No.: 826,261

[22] Filed: Feb. 5, 1986

[30] Foreign Application Priority Data

Feb. 18, 1985 [JP] Japan .................. 60-21745[U]

[51] Int. Cl.⁴ .............................. B65H 7/12
[52] U.S. Cl. ................................... 271/263
[58] Field of Search ............. 271/263, 262, 265, 258, 271/259

[56] References Cited

U.S. PATENT DOCUMENTS

| 2,357,850 | 9/1944 | Reid | 271/263 X |
| 3,608,894 | 3/1968 | Ariyama | 271/263 |
| 4,420,747 | 12/1983 | Kistner | 271/263 X |
| 4,506,880 | 3/1985 | Dixon | 271/263 |
| 4,550,252 | 10/1985 | Tee | 271/263 |
| 4,579,334 | 4/1986 | Durajczyk | 271/263 |

FOREIGN PATENT DOCUMENTS 59-60592  4/1984  Japan .

Primary Examiner—Richard A. Schacher
Attorney, Agent, or Firm—Fleit, Jacobson, Cohn & Price

[57] ABSTRACT

An apparatus for detecting the thickness of a bank note has a plurality of detectors which slide along the surface of the bank note. The detectors are attached to a detection arm side by side. The detection arm is pivotably mounted an a machine frame. If one or more detectors slide on the bank note having a thickness exceeding a standard value, the arm is swung and the displacement of the arm is detected.

2 Claims, 9 Drawing Figures

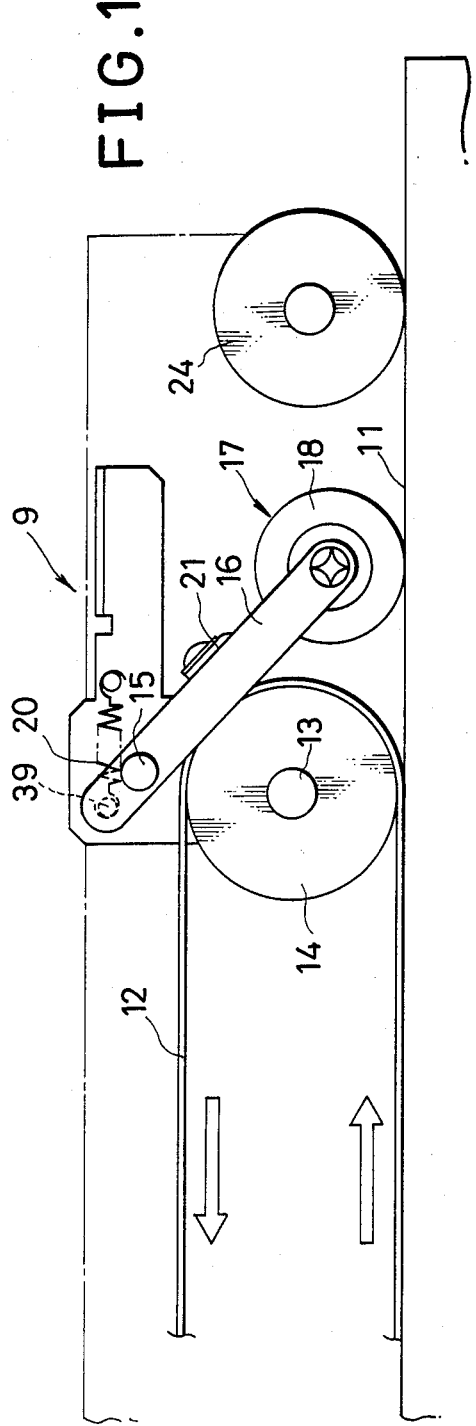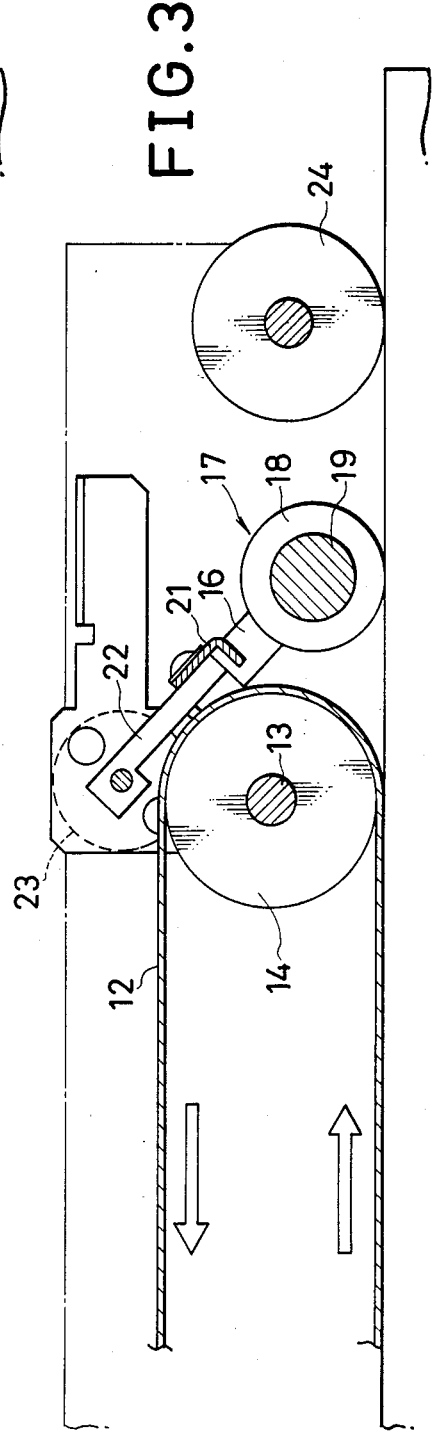

APPARATUS FOR DETECTING THE THICKNESS OF BANK NOTE

BACKGROUND OF THE INVENTION

This invention relates to an apparatus which is installed in an automatic money exchange machine and which detects the thickness of a bank note.

Heretofore, the determination of the genuineness of a bank note deposited in an automatic money exchange machine, or the like, has been mainly carried out by reading the pattern of a portion of the bank note and collating the read-out pattern with reference data. If a system of reading only the pattern of one portion of a bank note is adopted, however it cannot be categorically said that there is no possibility of a fabricated bank note, such as one made by cutting a bank note into slender strips and connecting some of them by using adhesive tape (see FIG. 9), being erroneously recognized and accepted as a genuine one.

To detect such a fabricated bank note, devices such as an "Apparatus for Detecting the Thickness of Paper and the Like" disclosed in the publication of Japanese Patent Public Disclosure No. 60592/1984 have been proposed.

This detection apparatus adopts a system in which, as shown in FIGS. 7 and 8, a planar detection arm 4 which is vertically rotatable about a shaft 3 as center is made to come into contact with a bank note 2 being transported on rolls 1, and the angle of rotation of the shaft 3 caused by the vertical movement of the detection arm 4 in accordance with the thickness of the bank note 2 is detected by a potentiometer 5. This detection apparatus is designed so that it can detect the change in an output signal from the potentiometer 5 when the detection arm 4 rotates (in the clockwise direction as viewed in FIG. 7) when a piece of adhesive tape (with a thickness of approximately 0.03 mm) which is thinner than the bank note 2 (with a thickness of about 0.09 mm) passes below the detection arm 4, thereby enabling the rejection of a fabricated bank note.

However, the detection apparatus of the above-described method is capable of detecting a fabricated bank note only when a piece of adhesive tape 6 passes below the detection arm 4, as shown in FIG. 9. Therefore, it is possible that such a detection apparatus will be incapable of detecting a fabricated bank note when a bank note strip 7 of a narrow width passes below the detection arm 4.

Accordingly, it is conceivable to provide a plurality of detection apparatuses, each constituted by a detection arm 4 and a potentiometer 5. However, this arrangement has the problem that it increases the cost of the apparatus.

SUMMARY OF THE INVENTION

It is, therefore, an object of the invention to provide, at a low cost, a thickness-detecting apparatus which is capable of positively detecting a fabricated bank note made by connecting a relatively small number of narrow strips of a bank note by means of adhesive tape.

To attain the aforementioned object, it has been noted that the joint portion where a bank note strip and a piece of adhesive tape overlap is thicker than a real bank note, so that the genuineness of a bank note can be determined by detecting whether any one of a plurality of detectors sliding along the surface of a bank note has been displaced by such a thicker portion.

DESCRIPTION OF THE DRAWINGS

Other objects and advantages of the present invention will become apparent from the following description made with reference to the accompanying drawings in which:

FIG. 1 is a side elevation of one embodiment according to the present invention;

FIG. 3 is a view taken along the line III—III of FIG. 2 in the direction of the arrows;

DESCRIPTION OF THE PREFERRED EMBODIMENT

One embodiment of the present invention will be now described in detail with reference to the accompanying drawings.

Figure 2:
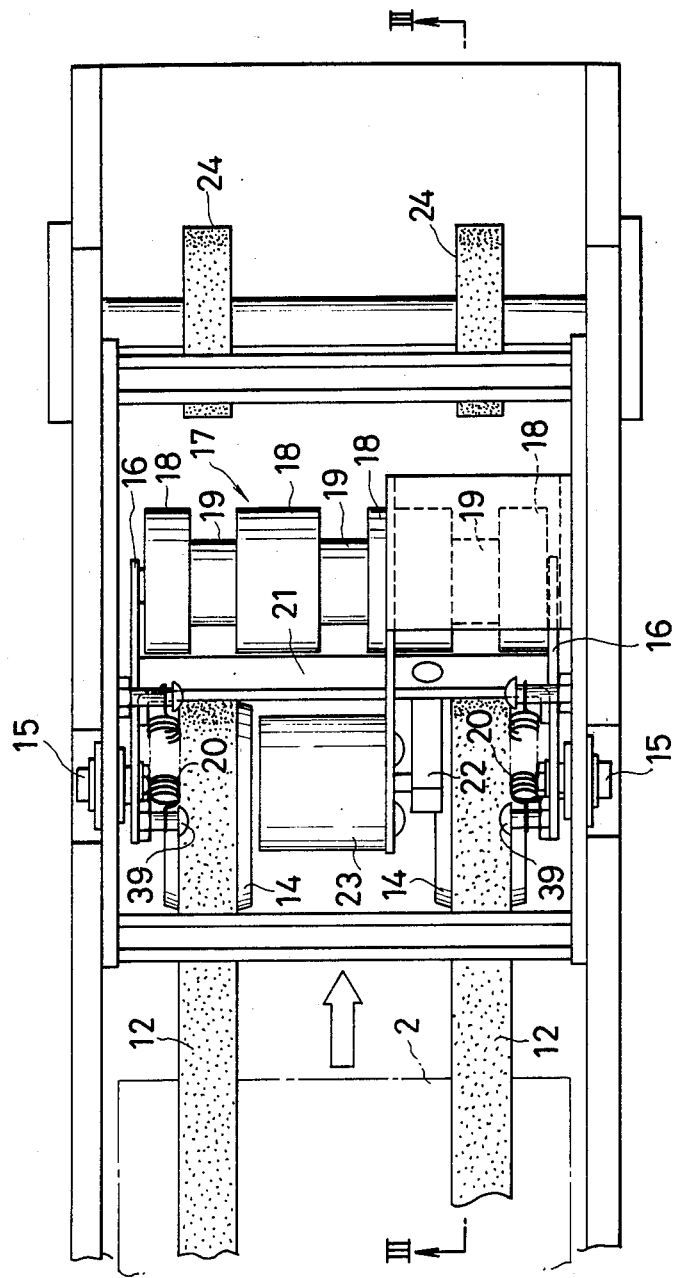
FIG. 2 is a plan view of the embodiment.
Figure 4:
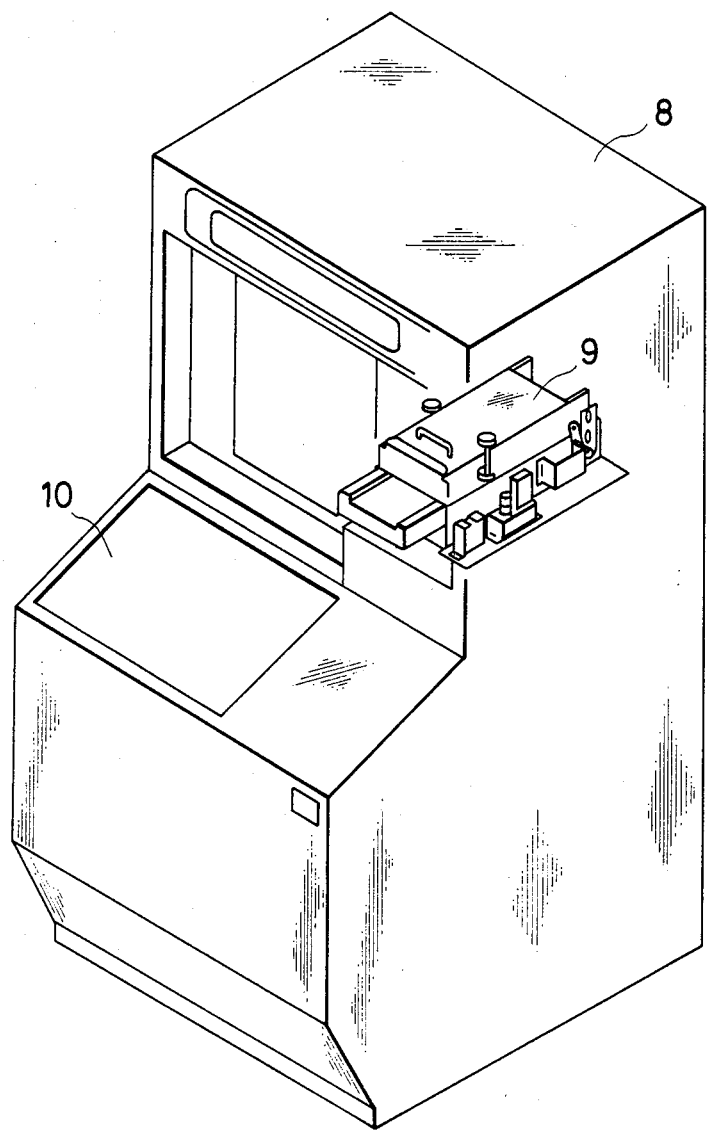
FIG. 4 is a perspective view illustrating the external appearance of an automatic money exchange machine provided with an apparatus for detecting the thickness of a bank note.

FIG. 4 shows the external appearance of an automatic money exchange machine to which the detection apparatus of the present invention is applied. This automatic money exchange machine has the functions of discriminating whether or not a bank note inserted into an inserted bank note discrimination mechanism 9 provided in a machine body 8 is acceptable, dispensing a prescribed a number of a designated type of bank note from a dispensing mechanism if the inserted bank note is judged to be acceptable, and returning the same to the inserted bank note discrimination mechanism 9 if it is judged to be unacceptable.

Next, a description will be made of the arrangement of a thickness-detecting apparatus provided in the inserted bank note discrimination mechanism 9.

A conveying surface, which comes into contact with the underside of the bank note 2 to support it, is provided inside the inserted bank note discrimination mechanism 9. Conveyor belts 12 which convey the bank note 2 by clamping it between themselves and the conveying surface 11, are provided above the conveying surface 11. In addition, the conveyor belts 12 are wound around belt rollers 14 rotating about a shaft 13, and run in the direction of the arrows shown in FIG. 1.

Support shafts 15 are provided above the belt roller 14, and each supports a portion of a detection arm 16 adjacent to the upper end thereof in such a manner that the detection arm 16 is vertically rotatable. A detection roller 17 is rotatably provided on the lower end portions of the detection arms 16. This detection roller 17 is constituted by large-diameter portions (detection portions) 18, which serve as detectors and which rotate the detection arm 16 in accordance with the thickness of the bank note 2 as they come into contact with the bank note 2, and small-diameter portions (notched portions) 19 provided between the large-diameter portions 18. The large-diameter portions 18 are provided at a plurality of places on the detection roller 17 at intervals along the axial direction of the detection roller 17.

A conventional thickness-detecting apparatus detects the difference between an approximately 0.09 mm-thick bank note and a piece of approximately 0.03 mm-thick adhesive tape, i.e., a 67% error, by a calculation as follows:

$$(0.09-0.03)/0.09 \approx 0.67$$

In order for the thickness-detecting apparatus of the above-described embodiment to detect that a joint portion where the bank note and the adhesive tape overlap is thicker by the thickness of the adhesive tape, it would be necessary for it to detect a 33% error, calculated as follows:

$$0.03/0.09 \approx 0.33$$

Accordingly, in order to positively detect a displacement corresponding to the additional thickness of the adhesive tape, it is necessary to provide a higher-grade surface finish than the surface roughness of at least about 0.03 mm.

Therefore, in this invention a pin 39 is secured to the upper end portion of each detection arm 16. The detection arm 16 is urged clockwise, as viewed in the figure, by means of a tensile coil spring 20 connected to the pin 39 so as to enable the detection roller 17 to be brought into close contact with the bank note 2 on the conveying surface 11.

In addition, a coupling member 21 is provided between the fixing portions and the tips of the detection arms 16, to link the detection arms 16 together.

A transmission member 22 is provided for the coupling member 21, and has the function of transmitting the rotational motion of the detection arms 16 to a potentiometer 23. The potentiometer 23 functions as a detection mechanism which detects the movement of the transmission member 22, i.e., the movement of the detection roller 17, and converts it into an electric signal.

Reference numeral 24 in the figures denotes rollers for drawing the bank note 2 into the body of the machine upon completion of the inspection of its thickness.

The detection apparatus having the above arrangement detects a fabricated bank note by the following operations.

Figure 5:
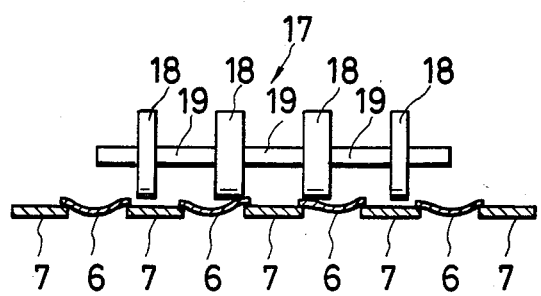
FIGS. 5 and 6 are diagrams illustrating the operation of the apparatus for detecting the thickness of a bank.

When the fabricated bank note 2 is inserted into the inserted bank note discrimination mechanism 10, it is conveyed rightward, as viewed in FIG. 1, by the conveyor belt 12, and passes below the detection roller 17. At this point, at least one of the plurality of large-diameter portions 18 provided on the detection roller 17 is pushed upward, as shown in FIG. 5, by one of the joints between the adhesive tape 6 and the bank note strips 7, i.e., any of the overlapped portions of the adhesive tape 6 and the bank note strip 7 which are thickner than a real bank note. As the detection roller 17 is raised, the detection arms 16 rotate counterclockwise, as viewed in FIG. 1, to actuate the potentiometer 23, which converts the displacement of the detection roller 17 into an electric signal.

Figure 6:
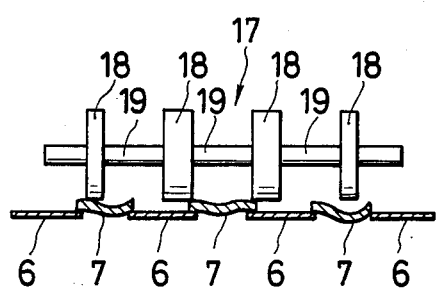
Figure 7:
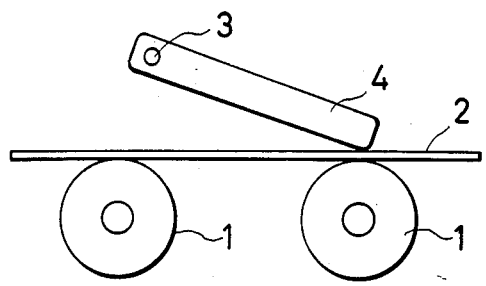
FIG. 7 is a side elevation of a prior art apparatus.
Figure 8:
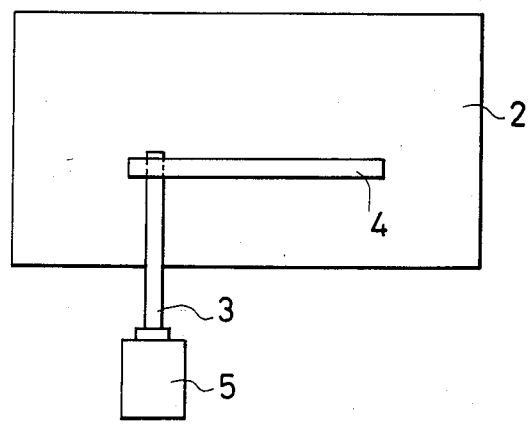
FIG. 8 is a plan view of the same.
Figure 9:
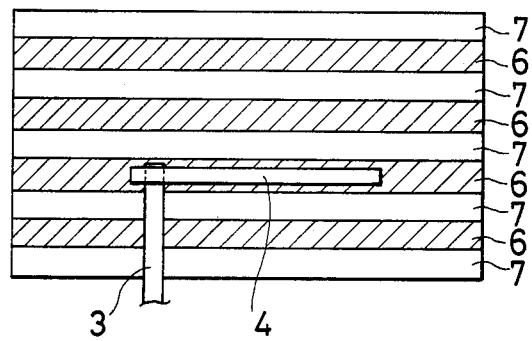
FIG. 9 is a diagram illustrating the state of detection in prior art.

Furthermore, as shown in FIG. 6, if the fabricated bank note is inserted in the direction opposite to that shown in FIG. 5, since the joint portions of the adhesive tape 6 and the bank note strips 7 are thicker than a real bank note, the detection arms 16 are raised as a large-diameter portion 18 passes over one of the joint portions to effect detection.

If an abnormality is detected, the bank note is returned by rotating the conveyor belts 12 and the rollers 24 in the reverse direction; but if no abnormality is detected, the bank note is taken into the body of the machine by the rollers 24.

The number of large-diameter portions formed on the detection roller and the intervals therebetween should not be restricted to those shown in the above embodiment; it goes without saying that they may be modified, as required, in accordance with the various different types of fabricated bank notes that can be foreseen.

In the above embodiment, a rotary roller is used as a detector, but a lever or the like that slides along the surface of the bank note may be used as a detector.

Moreover, the mechanism for detecting the displacement of the detector should not be restricted to that of the above embodiment; it may, of course, be modified as required.

As is apparent from the foregoing description, the present invention has the following advantages:

(i) If any one of the plurality of integrally movable detectors comes into contact with a joint portion, i.e., a thicker portion, of a strip of bank note and a piece of adhesive tape, the detection arms are displaced, enabling the actuation of the potentiometer. In consequence, it is possible to positively detect a fabricated bank note made by connecting a number of narrow strips of a bank note by means of adhesive tape.

(ii) Since the detector sliding along the bank note is divided into a plurality of pieces which are distributed over the entire range of detection, it is possible to reduce the area of the detector which requires sophisticated finishing, thereby reducing the production costs.

What is claimed is:

1. An apparatus for detecting the thickness of a bank note, said apparatus comprising:
   a frame,
   a roller having a plurality of detection portions adapted to be disposed on the surface of the bank note so that said detection portions rotate upon contacting the bank note and said detection portions being vertically movable as said detection portions rotate on the surface of the bank note,
   shaft means for supporting said detection portions at intervals spaced in a direction perpendicular to the direction of movement of said bank note,
   two detection arms supporting said shaft means, said detection arms being angularly movable by movement of said shaft means in response to the vertical movement of any one of said detection rollers,
   a support shaft for pivotally mounting each of said two detection arms on said frame,
   a potentiometer mounted coaxially with said support shafts for detecting the thickness of the bank note contacted by said rolers, and
   transmission means interconnecting said two detection arms and connected to said potentiometer for sensing the angular movement of the detection arms and transmitting the angular movement of the detection arms to said potentiometer.

2. An apparatus for detecting the thickness of a bank note claimed in claim 1, wherein said detection portions are circular.

* * * * *